United States Patent

[11] 3,634,766

[72] Inventor Marcel Louis Boyer
Chatillon, France
[21] Appl. No. 808,406
[22] Filed Mar. 19, 1969
[45] Patented Jan. 11, 1972
[73] Assignee C.I.T.-Compagnie Industrielle des Telecommunications
Paris, France
[32] Priority Mar. 19, 1968
[33] France
[31] 144397

[54] SINGLE SIDEBAND SYSTEM WITH MEANS FOR COMPENSATING FOR DOPPLER SHIFT

8 Claims, 3 Drawing Figs.

[52] U.S. Cl. .......... 325/65, 325/50, 325/329
[51] Int. Cl. .......... H04b 1/10
[50] Field of Search .......... 325/49, 50, 137, 138, 136, 330, 331, 329, 152, 63, 65, 419, 420, 423; 343/7, 228

[56] References Cited

UNITED STATES PATENTS

| | | | |
|---|---|---|---|
| 2,849,605 | 8/1958 | Fickett et al. | 325/49 |
| 3,271,681 | 9/1966 | McNair | 325/65 |
| 3,182,132 | 5/1965 | Barnes | 325/49 X |
| 3,426,278 | 2/1969 | van der Valk | 325/49 X |
| 3,492,580 | 1/1970 | Berman | 325/188 X |

*Primary Examiner*—Robert L. Griffin
*Assistant Examiner*—R. S. Bell
*Attorney*—Craig, Antonelli, Stewart and Hill

ABSTRACT: A single or independent sideband radio transmitter having a high-frequency section for transmitting a high-frequency signal modulated by a low-frequency bandwidth and which is connected to receive the lower bandwidth section from a speech circuit and the upper bandwidth section from circuitry providing two lateral bands of equal width and equispaced from a reference frequency provided by an oscillator, the generation of the lateral bands being controlled by the speech level, and a radio receiver having separator filters connected to isolate respective subbands of equal width from an upper section of a received frequency spectrum containing speech modulation components, modulating and filtering circuitry provided with a fixed-frequency local oscillator and deriving from the subbands and the oscillator output a signal having a frequency which is significant of the carrier frequency as modified by an uncontrollable frequency deviation, a demodulator fed by a variable-frequency oscillator and by the lower section of the signal frequency spectrum, and a system controlling the operating frequency of the variable oscillator in accordance with the output of a discriminator which compares the variable oscillator output frequency with said signal from said modulating and filtering circuitry.

SINGLE SIDEBAND SYSTEM WITH MEANS FOR COMPENSATING FOR DOPPLER SHIFT

This invention relates to a radio communication system and is more particularly concerned with reducing the influence of such phenomena as Doppler shift on the performance of a radio receiver.

Between the carrier frequency of a single side band transmitter or a transmitter operating with independent sidebands, and the carrier frequency to which the receiver is tuned, the maximum deviation of frequency permitted by some international organizations varies from a few hertz to some tens of hertz. For example, the North Atlantic Treaty Organization requires a maximum deviation of 45 Hz. or 22.5 Hz. in relation to the nominal frequency of the receiver and the transmitter. For a transmission at 45 MHz, a maximum deviation of 22.5 Hz. imposes a relative stability on the transmitter of $5 \times 10^{-7}$. If the transmission frequency is increased to 450 MHz the stability requirement reaches the even more stringent figure of $5 \times 10^{-}$.

In communication systems where relative motion occurs between the transmitter and the receiver, it is often not possible to obtain this degree of stability. For this reason single sideband communication with high-speed aircraft in flight is unsatisfactory when using metric wavelengths (VHF) or decimetric wavelengths (UHF). Although transmission would be possible using residual carrier frequency transmission, this results in a number of disadvantages such as an increase in the energy consumption if the range is to be maintained or conversely a reduction in the range if the energy output is to be maintained, and also a radio goniometric risk for military aircraft further the selective fading of the transmission could reach the residual carrier frequency and should this happen the extraction of the information transmitted is not possible.

The Doppler effect can produce deviations with modern high-speed aircraft that make the use of single sideband communication or independent sideband communication unacceptable if the maximum permitted deviations mentioned above are to be enforced. It can be shown mathematically that the frequency deviation caused by Doppler has an effect equivalent to a $10^{-6}$ loss of stability per Mach number of velocity. Thus, at 30 MHz the deviation is as much as 90 Hz. for a relative velocity of Mach 3 between the transmitter and the receiver and this deviation greatly exceeds the maximum permitted deviations mentioned above.

Whether the deviation is caused by Doppler or by an inadequate stability acting on connections within a supersonic aircraft, it is obviously desirable that a receiver of a communication system operating in single sideband or in independent sideband communication should be able to determine the deviation existing at any moment and to make due allowance for it, such determination being carried out without recourse to an independent high stability high-frequency local oscillator.

In accordance with one aspect of this invention there is provided a radio transmitter adapted to operate in single sideband or in independent sideband communication, having a high-frequency section for transmitting to an aerial a high-frequency signal modulated by a low-frequency bandwidth and which is connected to receive the lower bandwidth section from a speech circuit and the upper bandwidth section from circuitry providing two lateral bands of equal width and equispaced from a reference frequency provided by an oscillator, the generation of the lateral bands being controlled by the speech level.

In accordance with a second aspect of this invention there is provided a radio receiver adapted to operate in single sideband communication, having separator filters connected to isolate respective subbands of equal width from an upper section of a received frequency spectrum containing speed modulation components, modulating and filtering circuitry provided with a fixed-frequency local oscillator and deriving from the subbands and the oscillator output a signal having a frequency which is significant of the carrier frequency as modified by an uncontrollable deviation frequency, a demodulator fed by a variable-frequency oscillator and by the lower section of the signal frequency spectrum, and a system controlling the operating frequency of the variable oscillator in accordance with the output of a discriminator which compares the variable oscillator output frequency with said signal from said modulating and filtering circuit.

The invention will now be described in more detail, by way of examples, with reference to the accompanying drawings, in which.

Figure 1:
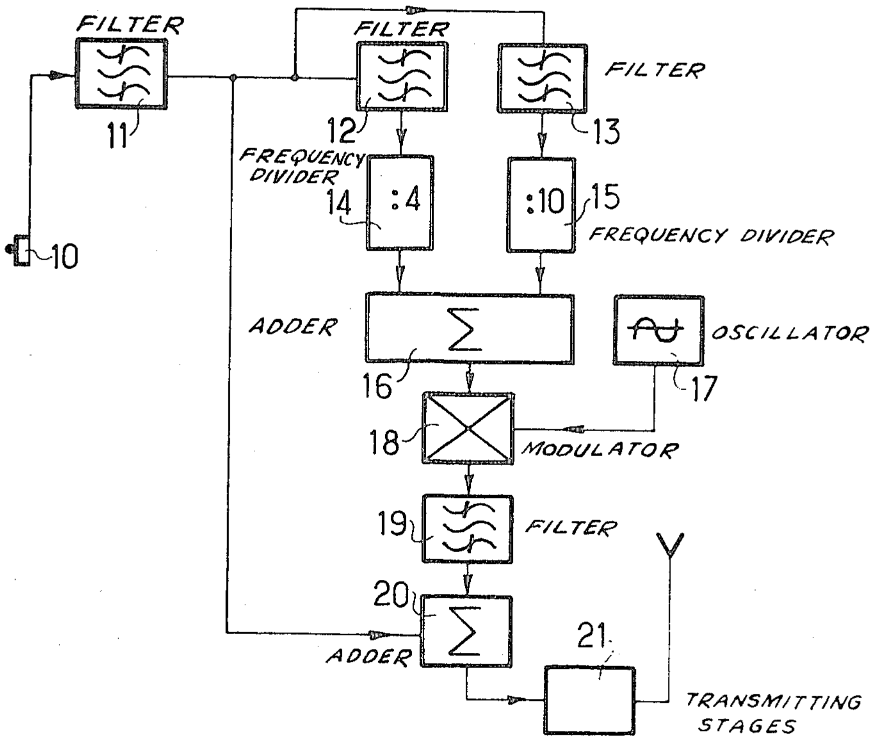
FIG. 1 is a simplified block diagram of a transmitter operating in single sideband.

FIG. 1 shows an audio frequency portion only of the transmitter. Voice signals are picked up by a microphone 10 and fed through a passband filter 11 which transmits a frequency range of 300 to 2,500 Hz. The output of the filter 11 is applied to two passband filters 12 and 13. The filter 12 passes a subband of 300 to 600 Hz. while the filter 13 passes a subband of 600 to 2,500 Hz.

The output of the passband filter 12 is applied to a frequency divider circuit 14 while the output of the second filter 13 is applied to a frequency divider circuit 15, the division ratios of those dividers being respectively 4 and 10. The divider circuit 14 supplies a band $B_1$ of frequencies covering the range 75 to 150 Hz. and the divider 15 supplies a second band of frequencies $B_2$ covering the range 60 to 250 Hz. These two bands $B_1$ and $B_2$ are fed into a summation circuit 16 which provides an output lying in a band of frequencies B covering the range of 60 to 250 Hz.

The output band B from the circuit 16 is fed into a modulator 18 where it is mixed with an auxiliary carrier frequency $f_1$ of 2,750 Hz. provided by an oscillator 17. The modulator 18 is suitably a ring modulator. The output frequencies from the modulator 18 are fed into a passband filter 19 which transmits those frequencies lying within the range of 2,500 to 3,000 Hz. The output from the filter 19 therefore comprises respectively on either side of the fundamental frequency 2,750 Hz. the sum and difference modulation products lying within the range of 250 Hz. above and below 2,750 Hz. The modulation products lying closest to the fundamental frequency of 2,750 Hz. are those displaced 60 Hz. above and below it, namely, 2,810 and 2,690 Hz.

The filter 19 transmits only those modulation products lying between 2,500 and 3,000 Hz. Thus the output of the bandpass filter 19 comprises two lateral subbands one extending from 2,500 to 2,690 Hz., and the other extending from 2,810 to 3,000 Hz.

The output frequencies from the filter 19 enter a summation circuit 20 which also receives the voice modulation signals lying between 300 and 2,500 Hz. from the microphone filter 11. The output from the summation circuit 20 therefore covers the spectrum of 300 to 3,000 Hz. which is applied as modulation to a carrier frequency of a transmitter 21 operating as a single sideband transmitter.

As the band B forming the output of the summation circuit 16 is formed by dividing two subbands of the voice modulation by 4 and 10, respectively, a portion of the voice signal energy is concentrated in a very narrow low passband of between 60 and 250 Hz. This concentration of the energy without loss reduces the risk of the signal strength output of the filter 19 being inadequate to provide the desired depth of modulation when eventually the transmitter carrier is modulated by the 500 Hz. width upper portion of the total modulating bandwidth fed into the transmitter 21.

Figure 2:
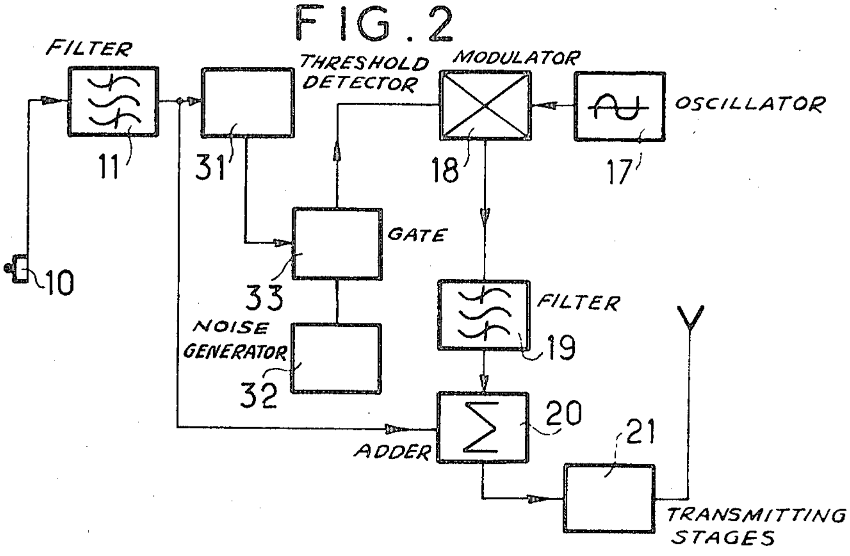
FIG. 2 is a simplified block diagram of a second arrangement of a transmitter operating in single sideband; and, FIG. 3 is a simplified block diagram of parts of a radio receiver for use with either of the transmitters shown in FIGS. 1 and 2.

FIG. 2 shows an alternative arrangement of a transmitter in accordance with the invention. The same reference numerals are used in FIG. 2 to denote parts of the transmitter corresponding to those in FIG. 1 which are similarly referenced. In FIG. 2 voice signals are fed to a band-pass filter 11 covering the range of 300 to 2,500 Hz. The output of the filter 11 is fed directly to a summation circuit 20 which provides an output bandwidth covering the range of 300 to 3,000 Hz. which modulates a carrier wave output of a transmitter 21 operating as a single sideband transmitter.

The output of the filter 11 is also fed to a threshold detector 31 which, if the signal strength is adequate, opens a gate 33 allowing the transmission of a low-frequency noise generator 32 to be fed into a modulator 18. The modulator 18 mixes the noise generator output with a frequency of 2,750 Hz. obtained from an oscillator 17 and the modulation products are fed to a band-pass filter 19 covering the range 2,500 to 3,000 Hz. The output of the filter 19 therefore comprises two lateral sidebands of equal width and disposed either side of it, one such lateral sideband comprising the range 2,500 to 2,750 Hz. and the other lateral sideband covering the range of 2,750 to 3,000 Hz. These are passed into the summation circuit 20 and occupy the upper 500 cycles of the 300 to 3,000 Hz. modulation signal fed to the transmitter 21.

Both of the transmitters described are designed to have minimum transmission of any pure frequency which might increase the risk of radio goniometric detection. As the transmitter operates on the single sideband principle, the information is conveyed in apparently random frequencies.

The numerical values given to assist explanation of the above description of the two transmitters are, of course, by way of example and are not intended to be restrictive to the scope of the invention claimed.

Figure 3:
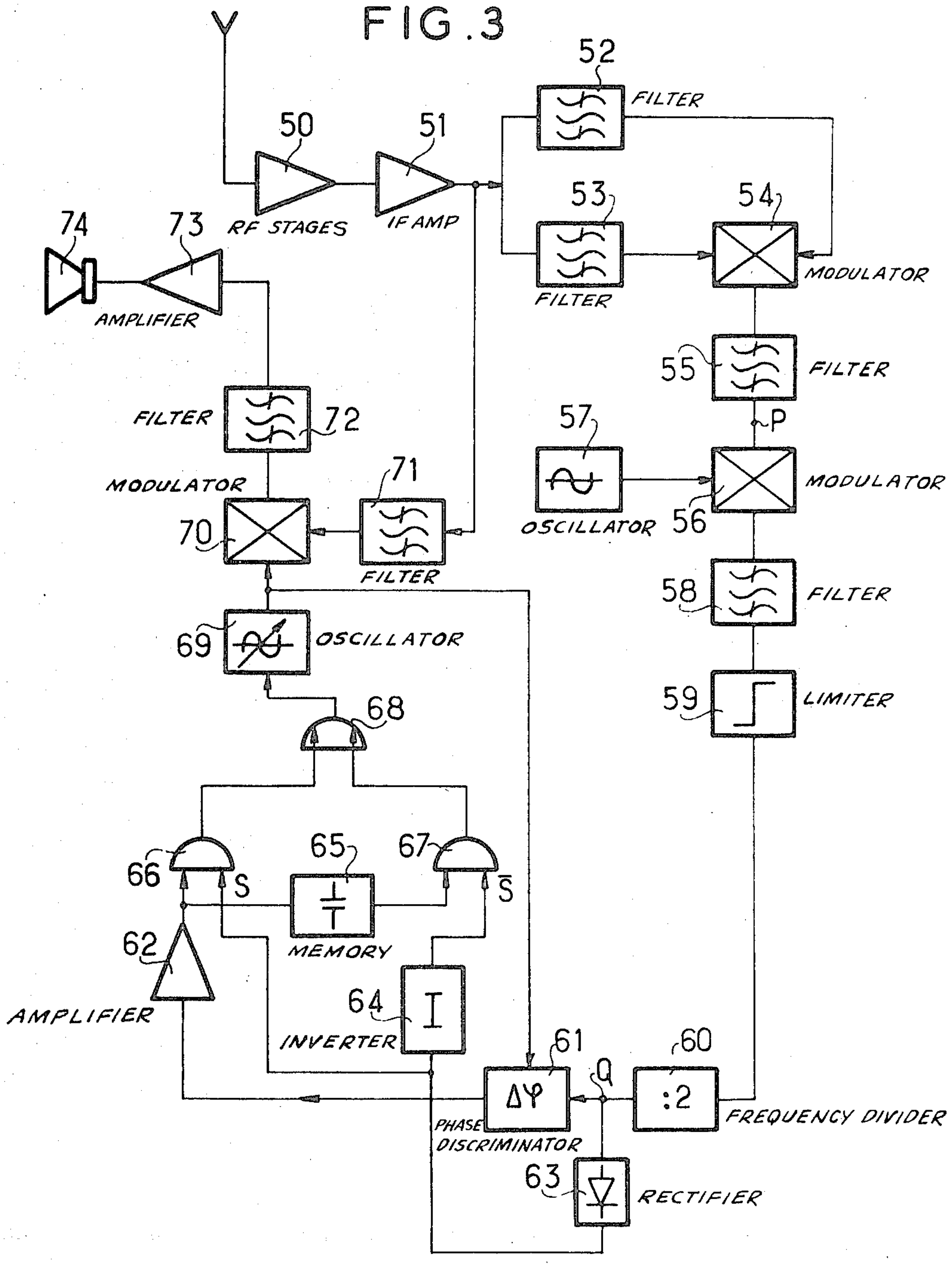

FIG. 3 shows a high-frequency portion of a receiver for use with either of the two transmitters described. The high-frequency portion 50 of the receiver is followed by an intermediate frequency amplifier 51 which provides an output signal at 250 kHz. with a possible frequency shift $e$ arising from, for example, Doppler effect or some other source.

The output signals from the amplifier 51 are applied to a pair of passband filters 52 and 53. The passband filter 52 transmits a frequency band of 252.5 to 252.7 kHz. while the second passband filter 53 transmits a band of 252.8 to 253 kHz. it will be appreciated that the filter 52 transmits the intermediate frequency of 250 kHz. modified by the lower lateral band coming from the band-pass filter 19 of the transmitter together with the deviation frequency $e$, while the other filter 53 transmits the intermediate frequency of 250 kHz. modified by the upper lateral band from the filter 19 together with the deviation frequency $e$. As the two lateral sidebands are produced by modulating a basic frequency of 2,750 Hz. which is not transmitted, the two lateral bands are of the same width above and below 2,750 Hz. but they are shifted in the same direction by the deviation frequency $e$ resulting from the Doppler effect.

The two filters 52 and 53 are connected to a modulator 54 whose output is fed to a filter 55 having a narrow passband centered on 505.5 kHz. This frequency will be recognized as being equal to twice the intermediate frequency of 250 kHz. plus twice the frequency of 2,750 Hz. produced by the oscillator 17 in the transmitter.

The output of the filter 55 is fed to a modulator 56 which also receives a signal of 5.5 kHz. The two inputs beat together to provide an output of 500 kHz. plus twice the deviation frequency $e$. This frequency is fed through a narrow band filter 58 which isolates it from the other modulation products and passes it to a clipper 59 supplying a frequency divider circuit 60. The output of the frequency divider circuit 60, the division ratio of which is two, therefore comprises a signal of 250 kHz. as modified by the deviation frequency $e$. This frequency appears at point Q.

The frequency at point Q is applied to one input terminal of a phase discriminator 61. The other input terminal receives the output frequency of a controlled variable oscillator 69 having a nominal output frequency of 250 kHz. which is variable by means of a variable-capacitance diode or varactor control circuit.

The output of the phase discriminator is applied through a linear amplifier 62 to one input terminal of an AND-gate 66 and also to a memory 65. As long as a frequency is present at point Q, a signal is transmitted through a rectifier 63 to a second input of the AND-gate 66 as a gate opening signal S. The output of the rectifier 63 is also applied through an inverter 64 to provide a gate-closing signal $\bar{S}$ to a second AND-gate 67. Thus the two AND-gates 66 and 67 operate selectively. The second AND-gate 67 has a second input terminal fed from the memory 65, and both AND-gates 66 and 67 have their outputs fed through an OR-gate 68 to control the frequency of operation of the variable-frequency oscillator 69.

The output of the oscillator 69 is fed to a modulator 70 which receives at a second input terminal the output signal of the intermediate frequency amplifier 51 by way of a band-pass filter 71 which transmits the intermediate frequency of 250 kHz. as modulated by the useful signal (300 to 2,500 Hz.) and frequency-shifted by $e$. The output frequency of the oscillator 69 is so controlled that it beats with the output of the filter 71 to remove the intermediate frequency and the deviation produced by the Doppler shift, i.e., $250 \pm e$. The output of the modulator 70 is fed through a passband filter 72 which transmits only the voice frequency band to a low-frequency amplifier 73 feeding a loudspeaker 74 or other electroacoustic device.

The receiver functions as follows.

If the incoming signal is modulated with speech information at normal level, the intermodulation of the two lateral bands passed by the filters 52 and 53 provides at P, after modulation and subsequent filtering by the filter 55, a frequency of $(505.5+2bq)$ kHz. This frequency, after beating with 5.5 kHz. from the oscillator 57, produces a frequency of $(500+2e)$ kHz. which is clipped and then divided by two to provide at point Q a frequency of $(250+e)$. If there is no deviation frequency $e$ the output frequency of the oscillator 69 is equal to the input frequency at point Q and the phase discriminator provides a constant output which is transmitted through the amplifier 62 to the AND-gate 66. The presence of the signal at Q holds the AND-gate 66 open so that the phase discriminator output signal is transmitted through the OR-gate 68 to maintain the output frequency of the oscillator 69 constant. The output of the amplifier 62 is also stored in a memory 65 which may comprise a low-loss capacitor.

Should the voice modulation disappear, the two filters 52 and 53 cease to transmit signals to the modulator 54 and the signal disappears from point Q. The output of the rectifier 63 applies a gate-closing signal to the AND-gate 66, which is translated by the inverter 64 into a gate-opening signal to the other AND-gate 67. The value of the control voltage stored in the memory 65 by the previous output of the amplifier 62 is now applied to the AND-gate 67 which is open and is fed through the OR-gate 68 to maintain the frequency of the variable oscillator 69 at the last value it had before the voice modulation disappeared. This frequency is maintained for the duration of the memory 65 which may be about one minute. Should voice modulation reoccur during this period then the receiver reverts to its former functioning condition at which the AND-gate 67 is closed and the AND-gate 66 is open.

Should Doppler or some other phenomena affect the incoming frequency by introducing a deviation $e$, this deviation frequency is doubled at point P. The deviation $2e$ is halved by the divider circuit 60 so that the frequency at point Q reflects the intermediate frequency and the deviation $e$. In consequence there is a phase disparity between the two inputs of the phase discriminator whose output therefore changes and transmits by way of the amplifier 62 and the gates 66 and 68 a signal to the varactor control of the variable oscillator 69 which changes its frequency in a direction agreeing with the frequency change produced by the deviation at the output of the intermediate amplifier 51. The demodulation carried out in the modulator 70 is therefore relatively unaffected by the deviation $e$ and the voice frequencies are still produced by the demodulation and, after amplification, are received by the loudspeaker 74.

From the above description it will be appreciated that the receiver compensates for the influence of Doppler shift. Moreover, the provision of the memory 65 maintains the frequency of the oscillator 69 for a short period after the voice modulation has been lost so that should the loss be caused by a temporary signal fade it will be recovered as soon as the signal strength is restored.

It will be noted that the two lateral bands lying between 2,500 and 3,000 Hz. do not intrude into the speech band of 300 to 2,500 Hz. The system described in usable with single sideband communication systems and also with systems working in separate sideband irrespective of the nature of the signals transmitted.

I have shown and described several embodiments in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are obvious to one of ordinary skill in the art.

I claim:

1. A radio transmitter for single sideband or independent sideband operation, comprising first means providing voice frequency signals over a prescribed frequency range, second means for generating a band of frequencies lying above said prescribed frequency range, said band including two sidebands of equal width resulting from the modulation of a reference frequency by an auxiliary signal, third means for adding said voice frequency signals to said band of frequencies generated by said second means to provide a low-frequency band, and fourth means for modulating a high-frequency signal with said low-frequency band.

2. A radio transmitter as defined in claim 1 wherein said second means includes second and third filters connected to the output of said first means for selectively passing different segments of said prescribed range of voice frequency signals, respectively, first and second frequency dividers connected to the outputs of said second and third filters, respectively, a first summing circuit for summing the outputs of said first and second dividers to provide said auxiliary signal, a modulator having inputs receiving said auxiliary signal and said reference frequency to provide a range of modulation products, and a fourth filter connected to the output of said modulator to pass said band of frequencies.

3. A radio transmitter as defined in claim 2 wherein said first and second dividers provide different ratios of division.

4. A radio transmitter as defined in claim 1 wherein said second means includes a noise generator providing a low-frequency noise spectrum, a modulator receiving said reference frequency and connected to said noise generator for modulating said reference frequency with said low-frequency noise spectrum, a second filter connected to the output of said modulator to pass said band of frequencies.

5. A transmitter as defined in claim 4 further comprising a threshold detector connected to the output of said first means and providing a control signal in response to detection of a given output level and wherein a gate circuit is provided to selectively connect said noise generator to said modulator in response to said control signal.

6. A radio receiver adapted for cooperating with a transmitter as claimed in claim 1, said receiver comprising first and second separator filters connected to isolate from the received signal, at the demodulation frequency respective subbands of equal width respectively corresponding to said two sidebands, said subbands being equally spaced from a center frequency, modulating and filtering means for deriving from said subbands a first signal having twice said center frequency, an oscillator delivering a second signal at a frequency equal to twice said reference signal, and further modulating and filtering means for deriving from said first and second signals a third signal; a frequency divider delivering a fourth signal having a frequency equal to half the frequency of said third signal, a demodulator fed by the output of a variable-frequency oscillator and by that part of the received signal corresponding to said voice frequency signals, and a system controlling the operating frequency of the variable oscillator in accordance with the output of a discriminator which compares the variable oscillator output frequency with said fourth signal.

7. A receiver as claimed in claim 6, in which the discriminator is a phase discriminator.

8. A receiver as claimed in claim 7 including a memory, also fed by said frequency divider, and a switching circuit connected to respond to the absence of said fourth signal by switching over the control of the variable oscillator from said phase discriminator to said memory which is arranged to hold a value significant of the discriminator output before the disappearance of said fourth signal.

* * * * *